Dec. 20, 1966 D. T. CARLSON 3,292,306
METHODS AND APPARATUS FOR ACHIEVING CONTROLLED
LARGE-SCALE CLIMATE AND ATMOSPHERIC EFFECTS
Filed April 15, 1965 4 Sheets-Sheet 1

INVENTOR.
Drexel T. Carlson
BY
ATTORNEYS.

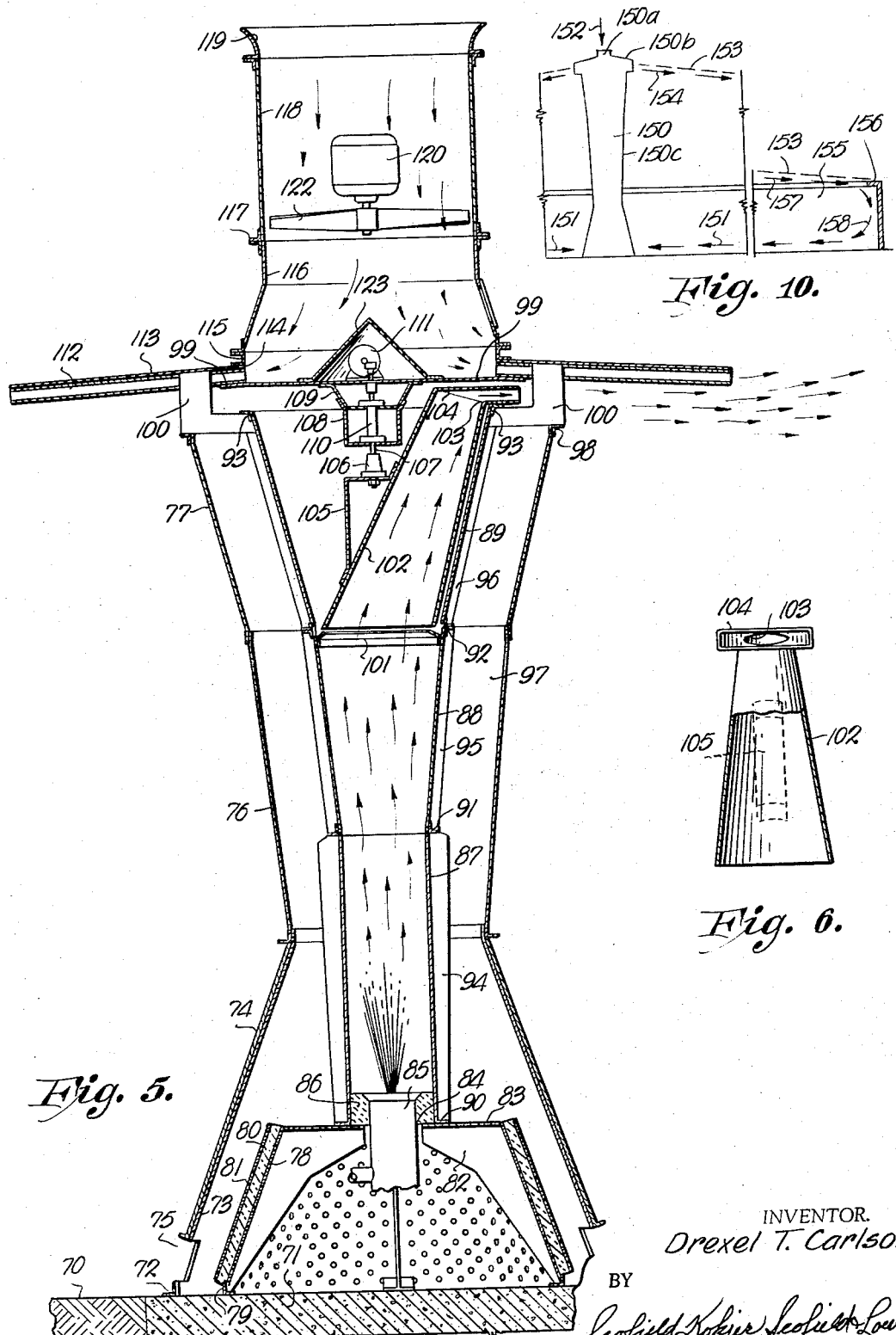

INVENTOR.
Drexel T. Carlson
BY
Scofield, Kokjer, Scofield & Lowe
ATTORNEYS.

Dec. 20, 1966 D. T. CARLSON 3,292,306
METHODS AND APPARATUS FOR ACHIEVING CONTROLLED
LARGE-SCALE CLIMATE AND ATMOSPHERIC EFFECTS
Filed April 15, 1965 4 Sheets-Sheet 4

INVENTOR.
Drexel T. Carlson
BY
Scofield, Kokjer, Scofield & Lowe
ATTORNEYS.

United States Patent Office 3,292,306
Patented Dec. 20, 1966

3,292,306
METHODS AND APPARATUS FOR ACHIEVING CONTROLLED LARGE-SCALE CLIMATE AND ATMOSPHERIC EFFECTS
Drexel T. Carlson, Kansas City, Mo. 64100
Filed Apr. 15, 1965, Ser. No. 448,330
19 Claims. (Cl. 47—2)

This invention relates to methods of and apparatus for achieving large scale air flow effects with optional heat addition thereto and refers more particularly to such method and apparatus wherein axially opposed, vertical, mass air flow effects are created and transformed into outward radial movement thereof in such manner as to effect unusual results thereby, particularly with respect to climate conditioning and temperature conditioning large zones and areas both indoors and out.

The method and apparatus is particularly adaptable to the protection of large areas and zones of crops from frost and freeze damage, circulation and heating of large masses of air in large scale enclosed indoor areas, and the like.

Numerous air circulating, distributing, heating and moving devices and systems have been developed in the past for such important purposes as attempting to protect crops from frost and freeze damage and the like. Cobb 1,317,-959, "Frost Preventor for Orchards, Etc., issued October 7, 1919, shows a device employing a vertical stack, a fan driving air into and up the stack, oil heater means intermediate the height of the stack to add heat thereto and a deflector plate or tube rotatable at the top of the stack to send heated air currents out over the field in a directed manner. Cobb's goals are heating, air circulation, production of eddy currents, etc. Cobb's later Patent 1,357,314, "Process of Preventing Frost for Heat Injury in Orchards, Etc.," issued November 2, 1920, shows an additional modification of this basic design with a circulate deflecting hood at the top of the stack for uniform distribution of a ceiling or radially moving layer of heated air over a zone of crops. The patent to Waterman 1,499,894 develops the concept of providing a first stream or column of rising, heated and humidified, (steam laden) air within a cylindrical column or house, this particular air permitted to leave the house only through downwardly angled apertures in radial dispersion, an additional flow of air being provided downwardly circumferentially of the roof of the house or column by a propeller or fan at the apex thereof. Waterman's viewpoint is that, in a temperature inversion, there is a warm air upper strata which can be drawn down and mixed with the heated air supplied from inside the column or house. A common type of heater for fields, orchards and the like is seen in the patent of that name to Robinson et al. 2,641,085, issued June 9, 1953, wherein an elongate, shaped heater body is provided with burner means intermediate its height, intake means and bottom, diffuser means associated therewith, etc. A circular deflector plate is provided intermediate the height of the heater to deflect radially outwardly a quantity of air being passed upwardly out of the heater. Watkins 2,655,-764, issued October 20, 1953, discloses a "Device for Heating Orchards" considerably resembling FIG. 7 of the Cobb Patent 1,357,314, but differing in providing radial cool air inlets at the bottom of the stack and a rotatable baffled stack top deflector plate. Kerlin 2,691,847, issued October 19, 1954, provides a more elaborate blower, heater and distributor means in the stack than Watkins and Cobb in an attempt to achieve optimal stack flow and dynamics of dispersal flow with attempted trajectory control and circulation of the air produced from the stack in an essentially closed circular system. The two-directional, vertical, axially opposed air flow pattern of Waterman, supra, is attempted again in Thaheld 2,736,-137, issued February 28, 1956, wherein the avoidance of the expense of a closed vertical stack is attempted by the use of a plurality of radially disposed, vertically discharging simple air heaters under an umbrella-shaped deflector, a propeller for producing downward flow over the upper surface of said umbrella mounted centrally thereof, and thereabove. A modification utilizes a tapered stack with radial outlets, the latter above a centrally open dished radial deflector where the downwardly drawn air is more directly mixed with the heated air from below for circulation both above and below said deflector for close-in as well as further out control. Lindsay 3,055,145, issued September 25, 1962, "Air Distributing and Tempering Machine" extends the concept of vertically downwardly drawn air of Thaheld and Waterman, supra, in a differing manner wherein the existence of both the warm upper strata and a cold ground level air layer are recognized and attempted to be utilized or dealt with. Lindsay provides an enclosed air flow stack or column, drawing air downwardly entirely therewithin, adding heat thereto in the downward flow in the downward flow in the stack and distributing same radially or in controlled manner along ground level or slightly thereabove in a typically circular flow pattern.

The above patents represent certain attempts which are of record in the patent art to aid in solving the many and varied problems of climatic change, freezing, crop protection, climate conditioning of large air masses, production of large areas or zones of relatively conditioned atmosphere, etc. Whether or not any of these systems are currently in use or have been adequately tested, in addition to the numerous simpler or known used systems for such purposes is not known. However, the said problems remain, at least seemingly. Thus, a study and report by W. R. Wallace, staff member, Federal-State Frost Warning Service, Lakeland, Florida, published April 3, 1963, relating to the effectiveness of freeze protection systems in central Florida during the freeze of December 1962, indicates at least his view that there are several limitations to all existing or utilized frost protection means at the present time. Additional methods to those noted above include the use of wood fires, grove heaters, banking of young trees, various wind machines and sprinkler systems. Grove heaters and wood fires are evidently still the most widely used devices for freeze protection and are credited with saving more fruit, foliage and trees than all other protection devices combined. This is allocated to the facts that heaters and fires are capable of radiant as well as convective heat transfer. Radiant heat is relatively independent of weather conditions by virtue of the fact it requires no medium for transfer. However, radiant heat is only available to surfaces which are able to "see" the heater or fire. Surfaces blocked from the heat source do not receive direct radiation. Tree size is the factor which determines how much of the available radiant energy is absorbed by a grove. Large trees absorb a fairly high percentage of the total radiant output. In young groves practically all of the radiant energy is lost to the sky and ground. Convective heat is most effective when there is a strong natural temperature inversion.

A natural temperature inversion is the increase in temperature with height. Such thermal inversions build as the earth cools at a faster rate than the air stratifications above it. Each layer of air above the earth cools more slowly than the one beneath it. Such natural temperature inversions seem to exist only when there is very little natural wind, less than two to three miles per hour. On nights where there is a strong natural temperature inversion, convective heat transfers seem most effective, provided the exhaust velocities are not too great.

Heaters and fires are regarded as generally effective, provided there is a strong inversion with very little natural wind.

The value of wind machines evidently lies in their ability to distribute heat which is already available in the atmosphere. On clear, calm nights, when a strong natural temperature inversion builds due to the radiational cooling of the earth's surface, wind machines are evidently capable of raising grove temperatures several degrees and an even greater temperature increase can sometimes be achieved by the addition of heat from grove heaters or fires. Wind machine effectiveness seems to decrease as the strength of the inversion decreases to the point that on nights where there is no inversion, the amount of temperature increase induced by the wind machines approaches zero. When the natural wind velocity is greater than six (6) miles per hour, the wind machines seem to have little or no effect.

The use of water in freeze protection utilizes the fact that water has a high heat capacity and will release its latent heat of fusion at a temperature within the range of temperatures critical to plant life. The aid of large bodies of water in modifying the temperature of the cold air mass has long been used as a method of cold tempering and protection by agricultural areas on the south edge of lakes. Flooding is also extensively used, particularly in low lying areas where radiation cold creates a frequent frost hazard during the growing season. Spraying and sprinkling of water has been applied to truck and nursery crops with good success and recently this method was attempted with tree crops. On extremely cold and dry nights, the amount of heat lost in the water sprinkling or distributing systems is significant. If the supply of water is cut off for some reason, the supply of heat is also cut off, and sublimation will reduce the temperature of the ice surface formed to the wet bulb temperature if there is sufficient wind. Sprinkler systems seem to have proved similar to wind machines in that they are effective on a majority of, for example, the cold nights in central Florida, but are not effective in a severe freeze with extreme cold advection. The combination of low humidity, extreme low temperatures and strong winds results in greater freeze damage in springled groves than in unprotected groves. Additional loss results from limb breakage if the application of water is heavy.

An object of the invention is to optimally utilize both factors of air movement and heat transfer in apparatus and method which incorporate features of the two most effective frost protection devices discussed above, namely, grove heaters and wind machines, combining and maximizing certain of their inherent and most desirable characteristics.

Another object of the invention is to provide a substantially or completely automatic and effective climate inversion process and apparatus which will provide more effective frost and freeze protection by developing, in continuous manufacture, a "positive inversion," same supplemented with controlled heat, and also without the need for large numbers of workers to fire and maintain the equipment as are required by the use of existing protective devices and/or systems.

Another object of the invention is to provide methods of and apparatus for optimally effecting and utilizing the known principle of opposed, vertical, axial flows of air from above and below in climate conditioning a large area, marked improvements utilized in the manner, apparatus and modes of generating, conduiting, ducting, distributing and handling said flows, with or without relative mixing of the opposite direction air flows.

Another object of the invention is to provide methods of and apparatus for achieving most efficiently, effectively, powerfully and with the greatest possible control the maximum desirable, controlled zone, closed or recycle air circulation system by means of a single central apparatus, associate means also provided and utilized peripherally of said zone to aid in achieving and maintaining the desired circulation pattern, all such methods and apparatus of maximum simplicity and effect for a minimum cost.

Another object of the invention is to provide a wind machine simultaneously utilizing both upward and downward air flow, the central collection, conduiting, redirection and initial trajectory of such air flows achieved within and immediately without the apparatus with a minimum of turbulence, which latter would negatively effect and unduly limit the desired area of control and treatment, yet achieving maximum amounts of desired air turbulence, air mixing, eddy currents and the like where desired without the device by various means.

Another object of the invention is to provide climate conditioning devices and processes relating thereto wherein natural forces, such as wind and solar radiation, aid in causing air movement (stack effect) within the tower of the apparatus, optional use of blower and heater means within the device, as well as the shaping of the tower to optimum form, improving such characteristics and effects, additional means provided for increasing the quantity of air distributed and moved from natural inversion effects.

Another object of the invention is to provide an optimal apparatus in a single simple, durable, cheap, rugged, dependable, powerful form wherein, as the result of the combined forces and energies developed and effected by the device, great efficiency and coverage by a relatively heated "air blanket" is achieved circumferential of the device or a useful "inversion" within the height range of the crops to be treated, with turbulence and eddy currents remaining "trapped" under a created air blanket and the entire air mass utilized tending to remain in a closed circulating system whereby to maximize the efficiency and effectiveness of the heat drawn in from the natural inversion layer and also that provided within the device itself.

Another object of the invention is to provide the most complete utilization of and advantages from the heat energy emitted by products of combustion within the climate conditioning device itself, particularly the $CO_2$ gas thereof, the later having a high emissivity or heat radiation factor, which, additionally, due to its relatively "heavy" characteristics does not tend to escape as readily to the relatively higher atmosphere but is retained adjacent the ground level and absorbed by the plant life in a manner beneficial to growth.

Another object of the invention is to provide improved means and methods of handling axially oriented, vertically moving, opposed streams of flowing air generated or created by a wind machine drawing downwardly from an upper temperature inversion and also producing a rising column of heated air, the said opposed, axial flows each enclosed and optimally conduited for best flow characteristics, energy retention, heat transfer effects desired, etc.; both flows entirely produced within the climate device itself and mixed and directed in varied manners as may be desired, whereby to achieve or produce differing peripheral effects for differing external climatic conditions and an extraordinary capacity for predictable, controllable, calcuable, and thus dependably variable, distance and climate conditioning effects within its range, under varying wind, inversion, temperature, etc. effects.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

FIG. 5 is a side vertical section of a second form of a climate conditioning tower according to the instant invention.

FIG. 6 is a fragmentary detail of the upper portion of the distributing head for the rising air column in the tower of FIG. 5, parts cut away and shown in dotted lines to better illustrate the structure thereof.

FIG. 10 is a schematic side elevation of the tower of FIG. 1 employed in conjunction with a circular fence construction surrounding the said tower at a constant distance therefrom.

Referring to the figures, the first form of the subject climate control machine, seen in FIGS. 1-4, inclusive, will now be described.

Figure 1:
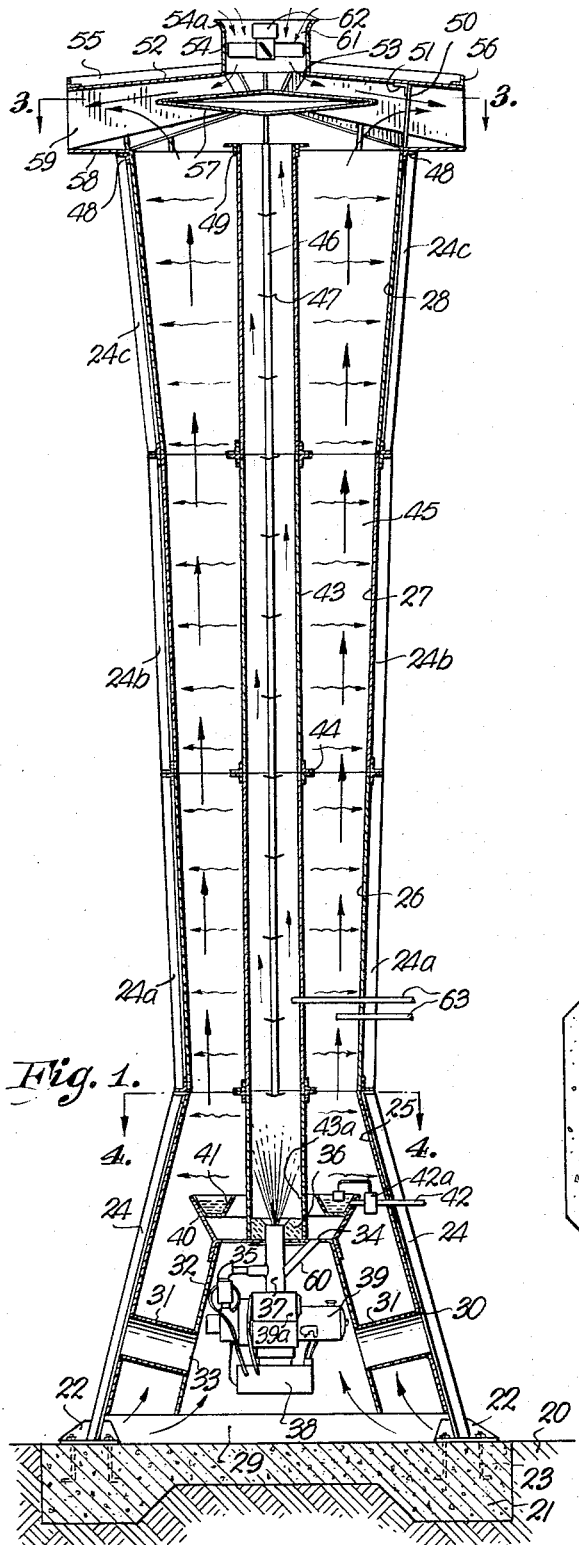
FIG. 1 is a side vertical sectional view of a first form of a climate conditioning device according to the instant invention.
Figure 2:
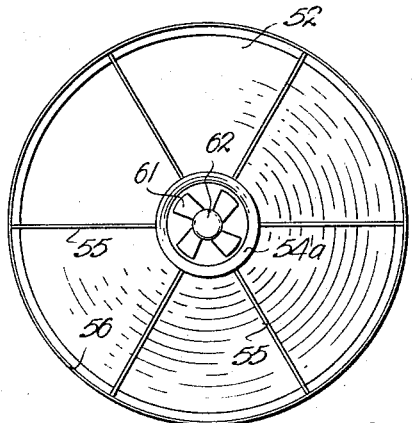
FIG. 2 is a top plan view of the device of FIG. 1.
Figure 3:
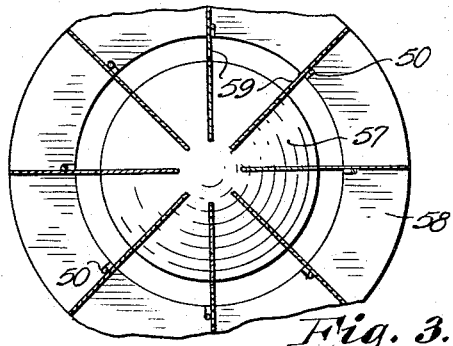
FIG. 3 is a view taken along the line 3—3 of FIG. 1 in the direction of the arrows.
Figure 4:
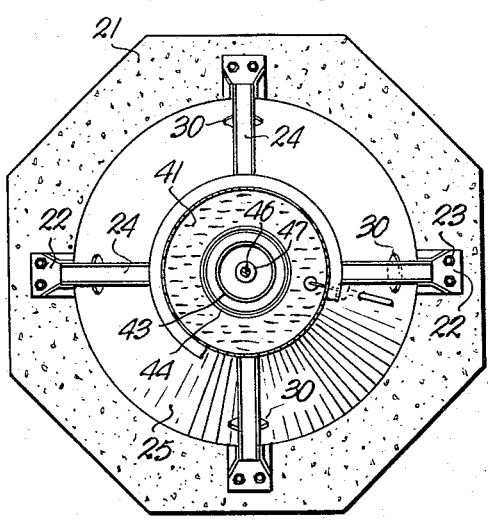
FIG. 4 is a view taken along the line 4—4 of FIG. 1 in the direction of the arrows.

At 20 in FIG. 1 is the ground level within which is preferably provided or prepared a suitable concrete base, foundation or footing 21. Positioned on footing 21 are base plates 22, four in number, as seen in FIG. 4, which are fixed to footing 21 by any suitable conventional bolts, connections, etc. 23. Fixed to plates 22 are upwardly and inwardly extending angle supports 24, which have additions thereto or extensions thereof 24a, 24b and 24c extending upwardly to a level close to the top of the tower. Fixed inwardly of each succeeding upwardly extending set of angle supports 24–24c, inclusive, are, first, upright frusto-conical skin sheet sections 26–28, inclusive. Frusto-conical sections 25–28, inclusive, are preferably smooth, unbroken sheetmetal shapes connected to one another at their upper and lower ends and forming an essentially closed outer stack save at the lowermost end of section 25. The latter is spaced upwardly from the ground level as at 29 for air intake purposes and has intake ports 30, four in number, therein, the latter leading into passages 31 extending inwardly of the outer stack. A frusto-conical sheet enclosure 32 is provided at the inward connections of passages 31 and has openings 33 therethrough whereby air from outside may pass inwardly thereof. Enclosure 32 has a closed upper end 34 save for opening 35 therethrough within which is positioned refractory body 36, itself providing therethrough a continuation of opening 35 whereby to receive the output stack 37 of a combined burner and blower system of conventional type generally designated 38. The burner of the burner-blower combination is fed with fuel oil, natural gas, or any other suitable fuel from a tank (not shown). Motor 39 powers the blower 39a of the combination. Circumferential support 40 is fixed to the upper end of enclosure 32 and carries inwardly of its upper end circumferential trough 41 operative to receive water therein for the purposes of humidifying air passing upwardly through the outer stack. The source of water may be from pipe 42 connected to a water line, tank or any other conventional source of water. Level may be controlled by a float and valve system 42a.

Mounted vertically atop the upper portion 34 of enclosure 32 is an elongate inner stack 43 made up of vertically successive cylindrical tube sections of sheet metal connected together by suitable conventional fittings as at 44, at the upper and lower ends thereof. Suitable internal bracing structurals may interconnect the inner and outer stacks at, for example, successive or alternate joints of the inner and outer stacked skin sections utilizing spider-type structurals of conventional type (not shown). Such inner bracing is preferably minimized in order to provide a clear flow annulus 45 between the inner and outer stacks. Elongate rod or shaft 46 extends substantially the vertical length of inner stack 43 and preferably has deflector baffles 47, circular in form, mounted thereon at intervals therealong for increased turbulence and gas flow mixing purposes. Rod 46 may be suspended by spider-type structurals from the walls of stack 43, or from the deflector structure above it to be described, as shown, or in any conventional manner.

At the top of outer stack upper skin sheet 28 and at the top of the inner stack 43 are provided encircling angle supports 48 and 49, respectively. To the former is attached vertical support members or rods 50. The latter connect at their upper ends to a circumferential angle support ring 51, the latter in turn receiving upwardly dished circular plate 52 thereon. Plate 52 has a central opening 53 therein and mounts cylindrical air conduit 54 circumferentially therearound, the latter having outwardly flanged upper air intake lip 54a. Conduit 54 may be of any desired height, but is preferably of an inner diameter substantially that of lower inner stack 43. A radially extending array of angle member structural supports 55 atop plate 52 connect at their outer ends to circumferential angle member edge support 56 and at their inner ends to the outer face of conduit 54.

A circular disc member 57 preferably of outer diameter intermediate between the uppermost outer diameter of upper outer stack skin sheet 28 and the uppermost outer diameter of inner stack 43 is horizontally mounted below plate 52. Disc 57 is preferably made of two dished circular metal sheets circumferentially connected at their outer edges, the unit assembly provided with suitable air breathing holes for air expansion and contraction therewithin under temperature change. Member 57 centrally is preferably spaced substantially equal distances below under plate 52 and above the upper end of stack 43. The periphery of member 57 is likewise preferably spaced substantially equidistant between the underside of plate 52 and the height of the upper end of stack sheet 28. Suitable means of any conventional type (welding or the like) connects member 57 on its upper and lower faces to flanges 59. Such connection may alternatively be in such manner that member 57 is vertically adjustable closer to or further away from plate 52 or the upper ends of the stacks. Likewise, the spacing between plate 52 and the upper ends of the stacks may optionally be made vertically adjustable to greater or lesser degree with or without corresponding vertical adjustability of member 57 whereby to give greater flexibility with respect to air flow control out of the two lower stacks and conduit 54.

Plate 52 preferably is of greater outer diameter than that of the upper end of upper stack skin sheet 28 whereby to provide an air flow deflecting umbrella or shield to aid in controlling the flow of air as it passes out of the wind machine. A substantially horizontal, circumferential, lower air flow guiding flange 58 may also be provided at the upper end of outer stack sheet 28. The outer diameters of plate 52 and flange 58 may be extended circumferentially outwardly as far as may be desired for directional air flow control. Vertical baffles as at 59 are further provided, spaced radially around the periphery of the upper tower between plate 52 and flange 58 thereby to aid air flow direction control and also permit closing off of one or more of the segments of the circumference between baffles 59 for selective air distribution from the tower.

Fan 61 is positioned within conduit 54 and driven by any suitable conventional power source 62, such as an electric motor or the like, said fan drawing air downwardly in through flanged opening 54a and driving same downwardly within conduit 54 through lower opening 53, said air flow deflected both downwardly and outwardly over and across the top surface of disc member 57 and under top plate 52. The mixing of rising air from stack 43 and flow annulus 45 below member 57 with the air from the annulus between the upper portion of member 57 and plate 52 is preferably as shown, namely, short of the periphery of annulus 45, in which case aspiration and entrainment of air out of annulus 45 is relatively markedly enhanced.

In function of the construction of FIG. 1, the following points should be noted. The burner-blower combination 38 utilizes air intake at the lower end of enclosure 32 and through passages 31, same thereafter discharged out through stack 37 into inner stack 43. Openings (not shown) may be provided at periodic intervals along inner stack 43, including as low as at level 43a whereby to aspirate additional intake air or pass heated air out into the annulus 45, depending upon the relative pressures and velocities between the inner stack 43 and the annulus 45. The air intake or output through ports at level 43a is drawn over or passed over the water surface in trough 41 for a humidifying effect. Radiant heat is given off by the outer surface of inner stack 43 into annulus 45 and the material thereof may be selected to enhance this effect. Radially inwardly extending ring or fin baffles (not seen) may be received on the inner face of stack 43 at vertical intervals therealong whereby to increase heating of said skin for such heat transfer effect, as well as increase of internal mixing and enturbulation of the air-combustion product flow upwardly therethrough. Air flow aiding or forcing means of any conventional type, such as fan blades mounted on a ring encircling stack 43, driven by a pulley-belt arrangement taken out through skin section 26 to a suitable power plant mounted on the outside of the outer tower may be employed, but such are not envisioned as either necessary or preferable. The heated, blower driven air flow out of the top of inner stack 43, after radial deflection by the angled under surface of member 57, moves outwardly of the tower, picking up, entraining and mixing with the optionally humidified air out of the top of annulus 45. Thus, a combination of factors of (1) optional aspiration inwardly of or outwardly from inner stack 43 relative to annulus 45 (lateral bleeds from burner-blower stack 37 may be taken out of same as at 60 through top 34 of enclosure 32, the side wall of enclosure 32, or the like, such bleeds damper controlled), (2) the heating effect of radiation from the outer surface of skin of stack 43 and (3) entrainment of air at the top of annulus 45 by air flow across same from the top of stack 43 all work to provide effective, large volume induced air flow upwardly through annulus 45.

Heater means of conventional type may additionally be supplied in conduit 54 above or (preferably) below fan 61, if desired, conduit 54 extended vertically as required above or below fan 61 with the fan vertical position varied therein to optimally space these elements in the air flow conduit. It is most important that the length of conduit 54 be sufficient to include the fan and burner components in such case, whereby all downwardly moving air in conduit 54 passed under plate 52 from opening 53 and the heating, tempering and conditioning stages thereof in any manner be fully enclosed, ducted and conduited for maximum efficiency. The height of conduit 54 may be extended vertically as desired, and the height of the stacks therebelow may likewise be varied, depending upon the desired conditions, by removing or adding sections thereto. The size of opening 53, the diameter of conduit 54, the diameter of the fan and the power thereof, etc., may be varied as desired. It is preferred that the diameter of fan blades 61 radially extend to just short of the diameter of conduit 54 for maximum effect and efficiency. Conditioning of the atmosphere in conduit 54 may additionally be supplied by water troughs and analogous to same at 41 positioned under the fan, atomization devices for water sprays from water sources mounted on plate 52, or the like, as desired. In such case, such sprays, atomizers, and the like are preferably positioned below fan blades 61, between plate 52 and member 57, or the like, whereby the air flow relative thereto is completely controlled.

The use of the burner in the lower burner-blower combination 38 will normally be essentially continuous in the function of the tower as optionally thermostatically controlled from a thermostat spaced from the tower. However, under certain conditions only the blower itself may be employed. Since fan 61 will often draw from upper layers of heated air in inversion conditions, the heating load on any heater in upper conduit 54 will generally be considerably less than the heating requirements for air drawn from the colder ground level and such heater, if any, provided in conduit 54 generally may be of relatively lesser capacity.

The distance between the periphery of disc 57 and circumferential ring angle 48 and the vertical gap between the upper surface of ring 48 and the periphery of disc 57 are adjusted so that the air flow from the underside of disc 57, which is presumed to follow known rules of jet flow dispersion of air from an orifice, will not strike angle 48. Such flow assumes a divergence of approximately 11° from the axis of the orifice. In all air flow channels, it is contemplated that, optionally, $CO_2$ gas may be input downstream of any heat source. Thus, flow line 63 may input $CO_2$ gas from any suitable conventional source into the inner and outer stacks above the burner-blower combination 38. If a heater is employed below fan 61, like conduits may flow $CO_2$ gas below said heater into conduit 54 for dispersion across and above disc 57. The goal in such case is the dispersion from the climate machine of heated carbon dioxide gas with a high radiation factor.

To get maximum aspirative effect on the heated or conditioned air from the inside stack, the diameter of disc member 57 is less than the upper diameter of the outer stack. If member 57 extended to the outer edge of ring 48, there would be less direct and immediate contact of the air from upper conduit 54 with the air from the lower stacks, thus lessening the aspirating action. There would be a tendency for air to be "pulled up" the outer surface of skin 28.

The construction of FIGS. 5 and 6 has numerous points and features in common with the previously described example or modification of FIGS. 1–4, inclusive, while differing in others. Ground level is at 70 with concrete foundation or footing at 71. Ring base angle support 72 connects to frusto-conical lower outer stack skin sheet 73. Sheet 73 may have overlying additional frusto-conical sheet 74, the latter with outwardly angled upper and lower edges, same contributing to structural rigidity and support. Opening or ports at level 75 are provided below sheet 74 and circumferentially around sheet 73 for supply of air from ground level to the outer stack and the inner stack to be described. Inverted frusto-conical outer stack sheets 76 and 77 extend upwardly and connect to one another and sheet 73 at the ends thereof.

Frusto-conical metal sheet 78 is perforated throughout the major area thereof and forms the lower wall of the base of the inner stack. Sheet 78 is connected to ring angle base 79 and optionally receives a sheet 80 of foraminous material such as bonded fiber glass mat circumferentially therearound and over for air filtering purposes. Sheet 80 may be film faced plastic or metal sheet with perforations therethrough as at 81, if desired, for aid in structural support of the foraminous material. Internal structural braces 82 may be employed if desired, same underlying and aiding in support of top 83, the latter having opening 84 therethrough to receive the discharge stack 85 of a burner-blower combination analogous to that in FIG. 1. Refractory block 86 has a central opening therethrough and receives stack 85 therethrough.

The inner stack is formed of a vertical series of metal sheets 87, 88 and 89 connected to one another at their upper and lower ends by suitable flanges, ring angles or the like as may be seen at 90 above top 83, 91 between sections 87 and 88, 92 between sections 88 and 89, and 93 at the top of section 89. Suitable vertical flanges, angle members or structurals as at 94, 95 and 96 may interconnect the said ring connections and support, brace and rigidity sheets 87–89, inclusive. Any desired or required additional internal radial or longitudinal structural bracing, such as rings, spiders, or the like may be employed between the inner and outer stack sections whereby to provide a suitable flow annulus 97 therebetween. Circular top cap or plate 99 is spaced upwardly from the stack upper ends by suitable structural support means. Spaced, radially extending vertical vanes 100 are connected at their upper ends to the underside of hollow ring plate 113 and at their lower ends to the stack section ring angles 93 and 98. Plate 99 is connected to the lower faces of C-members 112, the latter fixed to the underside of top plate 113.

Hollow, open-ended cone 101 is fixed peripherally to the inside surface of inner stack sheet 88 and feeds into angled, tapering frusto-conical tube 102 positioned closely thereabove but rotatable with respect to same, the latter detailed in FIG. 6. Tube 102 has oval opening 103 in the upper side thereof with deflector hood 104 operating to close the upper end of the tube while permitting expulsion of heated air, products of combustion, etc. received from cone 101. Bracket 105 is connected by any suitable engagement means 106 to rotating shaft 106 whereby bracket 105 and tube 102 rotate with shaft 107 around the axis of the latter.

Connected to the underside of plate 99 are frusto-conical sheet enclosures 108 and 109, some having openings centrally of the lower faces thereof to pass shaft 107 therethrough, bearing support means 110 for shaft 107 being received and mounted in and by said enclosures. A power source 111 for driving shaft 107 in rotation through any conventional linkage is mounted on the upper face of plate 99 centrally thereof.

Received on the underside of plate 113 are a plurality of radially spaced, outwardly extending C-shaped (in transverse section) angle support members 112, the latter mounting therebelow plate 99. Sheet 113 forms a closed hood or ceiling over supports 112 and has a central opening 114 therein. It should be noted that plate 99 may be extended outwardly, radially, as far as desired with respect to the stacks therebelow. Additionally, a parallel, lower ring flange (not shown) may be attached to the outer stack periphery and extended outwardly radially as far as desired, same connected to ring angle 98 or the like. Centrally and circumferentially mounted of plate 113 is a C-section angle ring support member 115 which mounts thereabove the lower downwardly diverging sheet section 116 of the upper air intake conduit. Mounted thereabove by suitable ring angle supports and connections 117 is conduit section 118 carrying thereabove outwardly flanged lip member 119. Power source 120 is mounted intermediate the length of the upper air conduit by any suitable spider or structural support, same driving shaft 121 in rotation carrying fan blades 122 thereby to drive air downwardly in the conduit and draw same in through intake lip 119.

An additional conventional heater means (not seen) may be optionally installed and employed in the upper conduit as previously described (preferably below fan 122 and above sheet 113) with respect to FIG. 1, as well as air humidifying and input spray devices or $CO_2$ conduits. Humidifying means may likewise be employed in the lower stack as shown and described with respect to FIG. 1 with optional air ducting from stack 85 between annulus 97 and the inner stack, also as previously described. A deflector cone 123 is provided centrally of plate 99 below fan 122, same covering power source 111. Cone 123 and members 108 and 109 are perforated for air aspiration under different temperature conditions.

The function and operation of the tower of this figure is identical in all general principles and air flow patterns, and the like with respect to that of FIG. 1, save for the rotating, air flow direction controlling tube member 102 in the inner stack. Use of member 102 provides a cyclic sweep effect, controlled aspiration from annulus 97, optional fixed directional control, if desired, variable rate of rotation, greater distance of throw of air, and the like.

Figure 7:
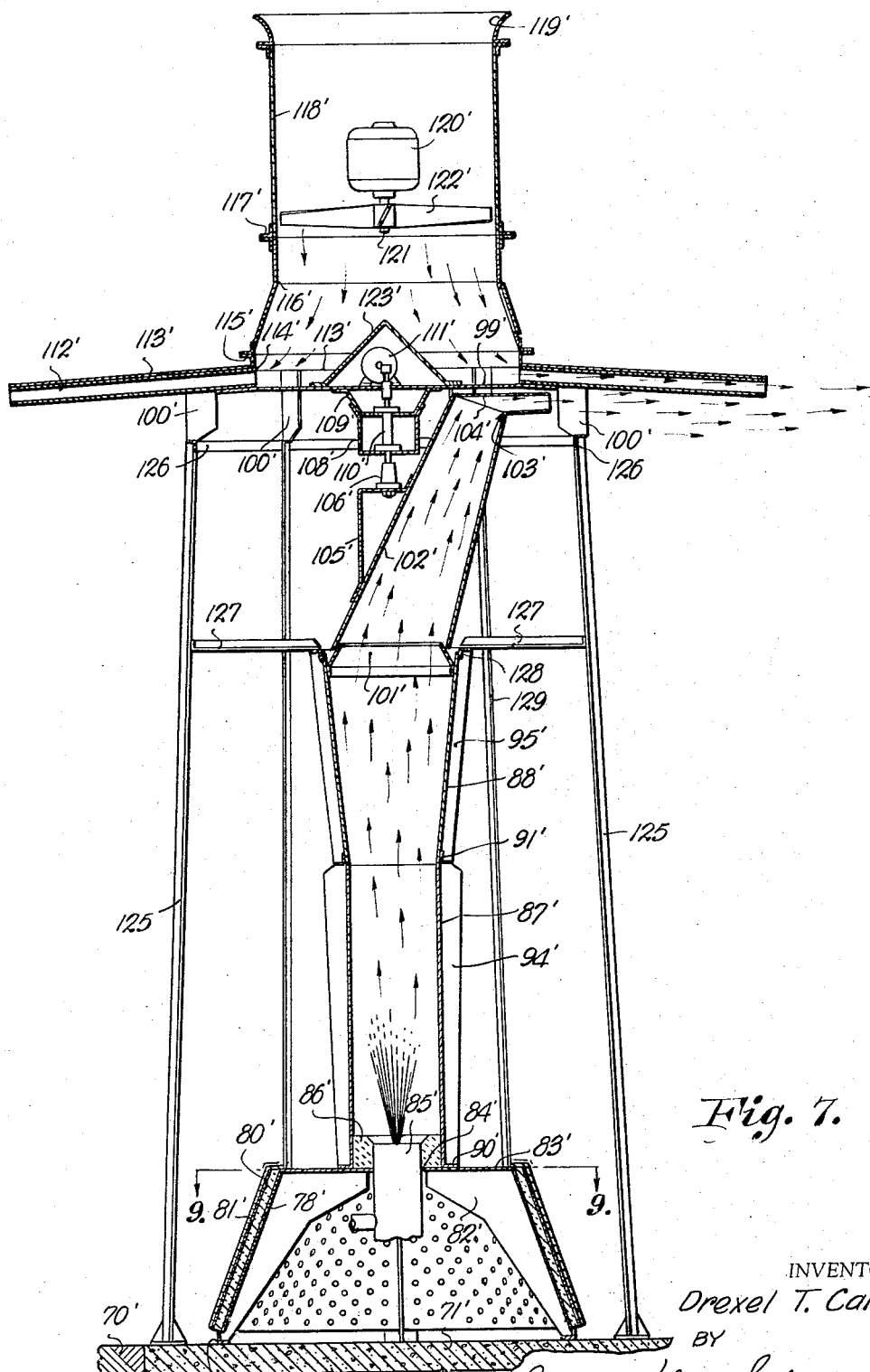
FIG. 7 is a side vertical section of a third form of a climate conditioning device according to the instant improvement, same particularly differing from the construction of FIG. 5 in that a concentric tower construction as seen in FIGS. 1 and 5 is not employed for the rising air column.
Figure 9:
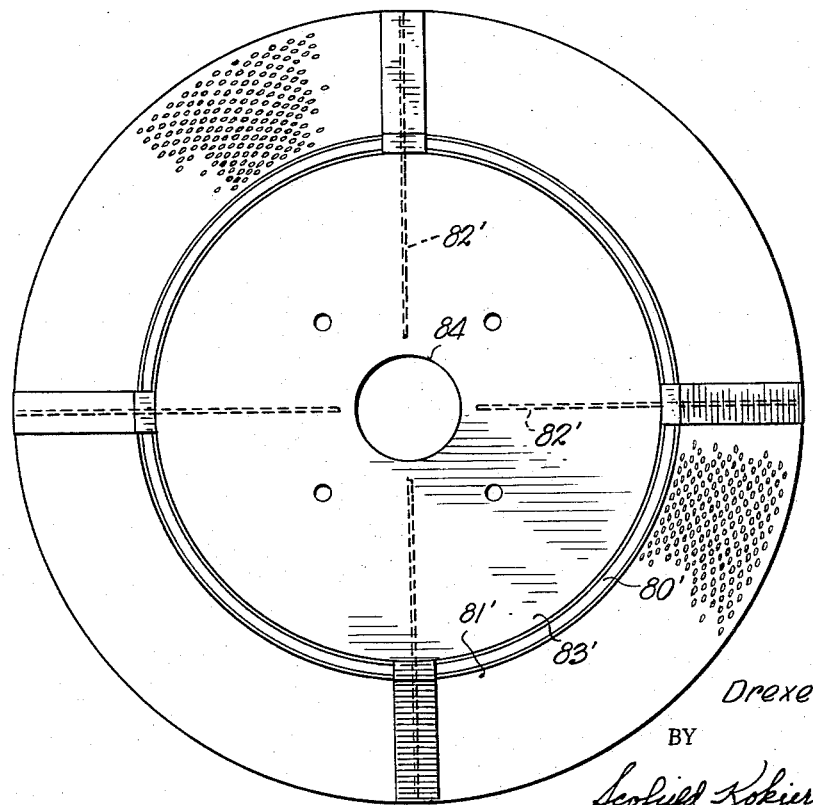
FIG. 9 is a view taken along the line 9—9 of FIG. 7 in the direction of the arrows.

Referring to FIGS. 7 and 9, therein is shown a tower and wind machine essentially like that of FIG. 5, save for the complete omission of the outer stack therefrom. In these views, all of the parts which are identical or substantially so between the views and structures of FIGS. 5 and 6 and FIGS. 7 and 9, respectively, are numbered the same, but primed. The description of these parts and relationship to one another, in so far as they are the same, will not be repeated.

The distinctions between the FIG. 7 and FIG. 5 constructions will now be detailed. Thus, as previously noted, the entire outer stack (skin sections 74, 76 and 77 of FIG. 5) have been omitted. Further, the upper stack skin section 89 of FIG. 5 has been omitted whereby the rotating conical discharge tube 102 is not enclosed in the lower part of its length. However, there is a continuous, essentially closed stack or column within skin sections 87', 88' and tube 102' with air discharge from opening 103'.

A set of angle supports 125 has been provided in lieu of the outer stack structure of FIG. 5. Angle supports 125 have at the upper ends thereof circumferential ring angle support 126, the latter connecting to the underside of vertical support baffles 100'. Radial or horizontal intermediate height angle supports 127 communicate from the inner sides of outer vertical angle supports 125 to the upper edge of stack skin section 88' via horizontal ring angle support 128 whereby to provide structural stability for same. Baffles 100' support ring plate 113', from which is suspended plate 99' via members 112'.

Such additional vertical, horizontal, central, radial and peripheral structurals may be added below plate 113' as are necessary for stability and integrity. The function of the device of FIGS. 7 and 9 is the same as that described for FIG. 5, but omitting all of the functions of the outer stack (74, 76 and 77) and the annulus 97 created thereby of the form of FIG. 5.

Figure 8:
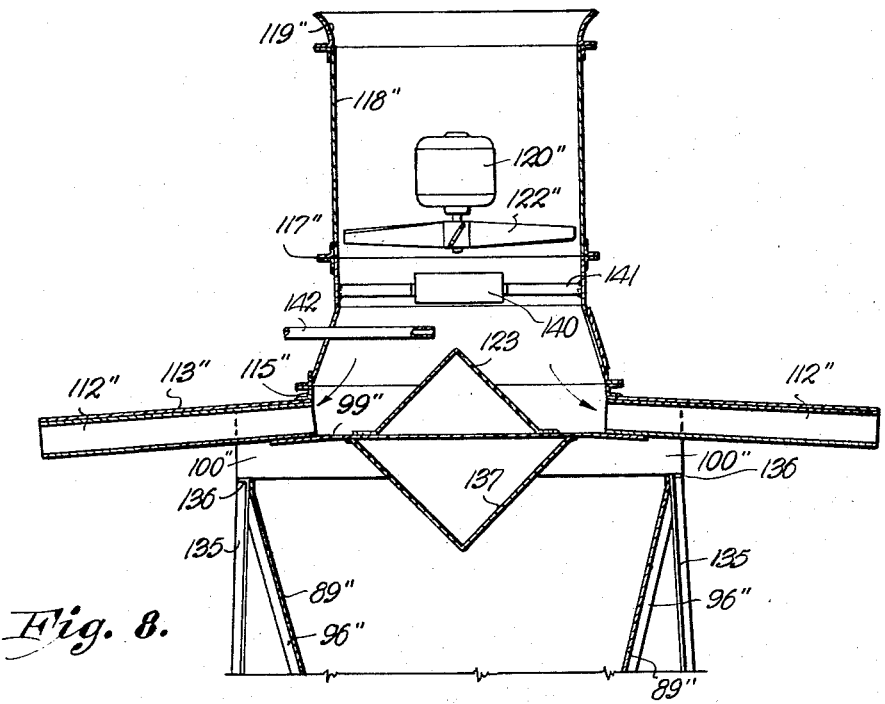
FIG. 8 is a fragmentary side section of the upper end of a fourth form of a climate conditioning tower according to the teachings of the instant improvement, same like that of FIG. 7 but utilizing only a single lower column or slack for the rising air supply, but utilizing a different initial air mixing and deflecting means and systems from those shown in FIGS. 5 and 7.

FIG. 8 shows an example of the wind machine which is analogous to the structure described relative FIG. 5, except for the fact that the entire central stack structure of FIG. 5 is omitted with the upper outer stack skin section 77 visible. All of the parts substantially identical or identical between the views and structures of FIGS. 8 and 5 are numbered the same, but double primed. The identical structures will not again be described.

The distinctions in structure between the forms of FIG. 8 and FIG. 5 lie in the following. In the first place, in replacement of the outer stack skin support of the outer ends of baffles 100 in FIG. 5, vertical angles 135 may be employed to connect to and support ring angle horizontal support 136. Baffles 100'' are supported by vertical structurals 96'' and ring angle 93'' analogous to the previous construction. However, the inward extension of baffles 100'' preferably now extends centrally well over and interior of the lip of skin section 89'', as shown, whereby to better direct and channel air flow up out of the inner stack. Baffles 100'' support on their supper edges ring plate 113". C-members 112" depend therefrom and support plate 99" thereunder. An air deflection cone 137 is fixed to the underside of plate 99" and serves to deflect air outwardly under plate 99". Thus, FIG. 8 essentially illustrates FIG. 5 with the rotating tube discharge member 102 entirely removed whereby the aid flow of the inner stack moves upwardly through stack sections 87, 88 and 89. All deflector cones and devices shown in the views are preferably perforated for air aspiration under different temperature conditions. All of the functions of the outer stack alone and same in combination with the inner stack of FIG. 5 are omitted in the function of the device of FIG. 8. The burner and lower stack construction of FIG. 8 is essentially the same as centrally seen in the forms of FIGS. 7 and 9. At 140 is seen schematically designated an optional burner of conventional construction supported within the throat of the upper conduit by radial structurals 141. Optional $CO_2$ pipe 142 is also shown. These latter showings may be duplicated, if desired, in the upper conduits of the other figures.

In FIG. 1, with disc 57 having an outer diameter as shown with respect to the inner diameters of the two lower stacks, the inner diameter of conduit 54 and opening 53 may be increased with the outer diameter of disc 57 or approaching same without deteriorating the aspirating effect. Likewise with respect to FIG. 1, the outer diameter of disc 57 may be increased to substantially equal to the inner diameter of the upper end of the outer stack without destroying the aspirating effect for the annulus between the two lower stacks. In such latter case, the inner diameter of conduit 54 may be increased substantially to equal to the outer diameter of disc 57 also without disturbing such desired effect. In any case, the cross-sectional area from the periphery of the disc 57 to the turn of angle 48 should equal the air intake area at the base of sheeting 25 for best results.

With respect to FIG. 5, plate 99 may extend outwardly to the turn of angle 98 and still retain the desired aspirating effect. Again, the peripheral area from the peripheral edge of plate 99 to angle 98 should equal the intake area of openings 75 at the base of the outer stack.

In FIG. 7, plate 99' should not be restricted peripherally substantially interiorly of the outermost portion of hood 104' in its arcuate movement.

With respect to FIG. 8, the plate 99" should not extend outwardly substantially beyond the upper edge of sheet 89", whereby to permit achievement of the desired aspirating effect. Again in FIG. 8, the peripheral cross-sectional discharge area between the peripheral edge of plate 99" and the upper edge of sheet 89" should equal the air intake area at the bottom of the stack topped by sheet 89".

In all of the cases of FIGS. 1, 5, 7 and 8, and the previously described modifications thereof, the lower surface of the sheet of air passing off the top of disc 57 or plate 99, 99' or 99", should not intersect the upper edge of the outermost lower stack, which intersection would create flow hampering turbulence. Yet further, in no case of the modifications of FIGS. 1, 5, 7 or 8, or any of the described variations thereof, should the inner diameter of the upper conduit exceed the outer diameter of disc 57, plate 99, 99' or 99".

When the above relationships are adhered to, an aspirating effect may be achieved by use of a fan alone in the upper conduit or a fan and heater together in same, with respect to the outermost lower stack. If there is a fan or fan and burner, or some other upward air flow aiding in the said aspirated lower stack, such aspirating effect is enhanced. Thus in all cases, the heavier, colder lower level air may be aspirated by the use of the upper conduit or stack with flow forcing means therein. If the upper stack and lower same or outermost lower stack are of the same inner diameter, then the divider disc (per 57) or plate (per plate 99, etc.) is preferably of an outer diameter equal to the said like inner diameter. This construction will also create the desired aspirating effect. In the event no heater is employed in the lower stack or stacks, the lower stack wall or walls may be of canvas rather than metal. This is particularly apropos in the form of FIG. 8 where the lower stack may be a canvas cylinder spaced at the top below plate 99" and from the bottom above ground level, if no heater is employed therewithin.

In FIG. 10, there is seen a cooperative use of the climate conditoning tower or towers of the instant invention in combination with a circumferential fence, the latter uniformly spaced at a radial distance from the tower in such a manner as to essentially set up a closed air circulating system. Tower 150, for purposes of illustration, is the tower of FIG. 1, but it could be any of the towers of FIGS. 5, 7 or 8, or modifications thereof. A typically sized such tower would be twenty feet in height and a typical fence three to six feet in height. Tower 150 has upper flow conduit 150a, upper deflecting flange 150b corresponding to sheet 52 of FIG. 1, outer stack 150c corresponding to stack sheets 25, 26, 27 and 28 of FIG. 1, etc. There are air intake openings or slots below the outer stack in the manner of FIG. 1. Sheet 150b is preferably angled downwardly approximately 5° to 10° from horizontal whereby to disperse a downwardly inclined circular canopy or sheet of air therefrom. This air is partly drawn from ground level through the openings at the bottom of the outer stack of 150c as seen from the lower arrows 151 and partly drawn downwardly from above according to arrow 152. The air dispersed from the tower is along the line directed as seen at 153 or arrows 154. The peripheral fence comprises any suitable vertical supports, such as metal rods or tubes or wooden stakes and is preferably and typically of a height around six feet. It is continuous and unbroken, this effect cheaply achievable by the use of removable plastic material such as vinyl sheet, polyethylene sheet, or the like. Such sheeting is designated at 155. The upper portion of the fence sheeting or top thereof may optionally be extended inwardly somewhat along a horizontal line as at 156. The line of air travel into the fence is seen at arrows 157 with a change of direction seen at 158, same changing into the redirected and recycle flow direction of arrows 151.

For a given height of tower and a given trajectory of flow from the tower slots or orifices, the line of travel of air projected will strike the ground or a three to six foot high fence at certain radial distances from the tower. Placement of such a circular continuous concentrically positioned fence of plastic sheet or the like within such trajectory so the line thereof strikes below the top of the fence will (1) limit movement of air projected from the tower, (2) redirect air downwardly and inwardly, (3) retain heat, products of combustion and $CO_2$ gas, (4) set up a self-contained recirculating flow system between the circular air sheet above, the fence periphery and the ground level and the tower. Further, it will limit the quantity and amount of incoming colder air along the ground level and tend to suck down or retain the overlying moving ceiling of heated air. Vegetation or plants to be protected lie within fence 155 and outwardly of tower 150.

Certain advantages accrue from the use of a double stack arrangement, as seen in FIGS. 1 and 5, although same is more expensive than the single stack arrangements of FIGS. 7 and 8. This is particularly true where a burner is used in the lower central stack. Thus, the use of an outer stack gives more radiant surface area. It conserves radiation from the inner stack. It enables utilization of the aspirating effect of the inner stack to a maximum. It enables the use of humidifying and carbon dioxide injection means, alone or together, in a zone not directly subject to excessive heating and combustion action, as in the case in a heater equipped central stack. It permits alternative and variable adjustment of the factors of heating, blower action, humidifying action and carbon dioxide addition between the two lower stacks. It gives more area in the vane control zone under the baffle or disc. It offers means of protecting the inner stack, burner and blower apparatus associated therewith, and humidifying apparatus and the like associated therewith from wind, weather and heat loss. It affords an opportunity to move a greater air volume by various stack and aspirating effects with considerable control, so long as the overlying baffle area and overlying top flange or sheet area (52 for example) are optimally regulated. It affords opportunity to use protected filtering means as in FIG. 5 on the inner stack and gives good control points for air intake to the inner and outer stacks as may be seen in the lower portion of FIGS. 1 and 5.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A device for distribution and conditioning of air with respect to areas surrounding same comprising
a first vertically disposed tubular body extending from adjacent ground level to a substantial height thereabove,
air acceleration means in said first body adapted to aid in forcing air upwardly therein,
a second vertically disposed tubular body positioned above and substantially axially in line with the first body,
air acceleration means in said second body adapted to force air downwardly therein,
at least one air intake opening in the upper end of the second body and in the lower end of the first body,
said first and second bodies open for air discharge at their upper and lower ends respectively,
a substantially flat baffle of area at least equal to the cross-sectional discharge area of the upper of said two bodies disposed intermediate the respective lower and upper ends of said second and first bodies, respectively, whereby to receive air discharged from said bodies substantially normal thereto on each side thereof,
and a conical air deflector means centrally positioned of the upper side of said baffle means whereby to distribute the air discharge from the upper body uniformly radially of said bodies and entrain air from said lower body.

2. A device as in claim 1 including a conical air deflector means centrally positioned of the lower side of said baffle means whereby to distribute the air discharged from the lower body uniformly radially of said bodies.

3. A device for distribution and conditioning of air with respect to areas surrounding same comprising
a first vertically disposed tubular body extending from adjacent ground level to a substantial height thereabove,
air acceleration means in said first body adapted to aid in forcing air upwardly therein,
a second vertically disposed tubular body positioned above and substantially axially in line with said first body,
air acceleration means in said second body adapted to force air downwardly therein,
at least one air intake opening in the upper end of the second body and in the lower end of the first body,
said first and second bodies open for air discharge at their upper and lower ends respectively,
the internal diameter of said second tubular body considerably less than the internal diameter of said first tubular body, and
a substantially flat baffle of area at least equal to the cross-sectional discharge area of the upper of said two bodies disposed intermediate the respective lower and upper ends of the second and first bodies, respectively, whereby to receive air discharged from said bodies substantially normal thereto on each side thereof.

4. A device as in claim 3 including conical air deflector means centrally positioned of each of the upper and lower sides of said baffle means whereby to distribute the air discharged from the upper and lower bodies uniformly radially of said bodies and entrained air from said lower body.

5. A device as in claim 3 including a peripheral, circumferentially extending, downwardly angled peripheral flange attached to the lower discharge end of said second tubular body and overlying the outer edge of the upper discharge end of the first tubular body.

6. A device as in claim 3 wherein said baffle intermediate the lower and upper ends of said first and second bodies is of an outer diameter intermediate the inner diameters of the discharge ends of said first and second bodies.

7. A device as in claim 3 including circumferential ring flange means connected to the base of said second body and extending substantially normal thereto and circumferentially outwardly of said baffle and additional circumferential ring flange means connected to the top end of said first body, extending substantially normal thereto and circumferentially outwardly therefrom, the upper one of said ring flange means at least of equal outer diameter to the outer diameter of the lower one of said ring flange means.

8. A device as in claim 3 including circumferential ring flange means connected to the base of said second body and extending substantially normal thereto and circumferentially outwardly of said baffle whereby to direct and overlie the radial air discharge from said device, and vertical flow directing vanes positioned between said ring flange and baffle upper surface.

9. A device as in claim 7 wherein vertical flow directing vanes are positioned between each said ring flange and said baffle on each side of the latter.

10. A device as in claim 3 including heater means in said second tubular body downstream of the air accelerating means therein.

11. A device for distribution and conditioning of air with respect to areas surrounding same comprising
a first vertically disposed tubular body extending from adjacent ground level to a substantial height thereabove,
air accelerating means in said first body adapted to aid in forcing air upwardly therein,
a second vertically disposed tubular body positioned above and substantially axially in line with said first body,
air accelerating means in said second body adapted to force air downwardly therein,
at least one air intake opening in the upper end of the second body and in the lower end of the first body,
said first and second bodies open for air discharge at their upper and lower ends, respectively,
a third vertical tubular body substantially axially in line with said first and second bodies and positioned concentrically outwardly of said first body,
said third body open at its upper end and having at least one air intake opening in its lower end, the internal diameter of the second body lower discharge end greater than the internal diameter of the first body upper discharge end and less than the inner diameter of the third body upper discharge end, a substantially flat baffle of area at least equal to the cross-sectional end area of the lower end of the upper body, said baffle disposed intermediate the respective lower and upper ends of said second and first and third bodies, respectively, whereby to receive air discharge from said bodies substantially normal thereto on each side thereof, distribute same radially and entrain air from the annulus between the first and third bodies.

12. A device as in claim 11 including conical air deflector means centrally positioned of the upper and lower sides of said baffle means whereby to distribute the air discharged from the upper and lower bodies uniformly radially of said bodies.

13. A device as in claim 11 including circumferential ring flange means connected to the base of the second body and extending substantially normal thereto and circumferentially outwardly of the periphery of said third body upper end, whereby to aid in control of said radial air flow.

14. A device as in claim 13 including vertical flow directing vanes between said ring flange and baffle upper surface.

15. A device as in claim 11 including circumferential ring flange means connected to the base of the second body and extending substantially normal thereto and circumferentially outwardly of said baffle and circumferential ring flange means connected to the top of said third body and extending substantially normal thereto and circumferentially outwardly thereof, the upper of said ring flange means of at least equal outer diameter to the lower of said ring flange means.

16. A device as in claim 15 including vertical flow directing vanes between each of said ring flanges and the side of said baffle next thereto.

17. A device as in claim 11 wherein said air accelerating means are fans and heater means are provided in said first and second bodies downstream of said air accelerating means.

18. A device for distribution and conditioning of air with respect to areas surrounding same comprising
a first vertically disposed tubular body extending from adjacent ground level to a substantial height thereabove,
a second vertically disposed tubular body positioned above and substantially axially in line with the first body,
air acceleration means in said second body adapted to force air downwardly therein,
at least one air intake opening in the upper end of the second body and the lower end of the first body,
said first and second bodies open for air discharge at their upper and lower ends respectively,
the cross-sectional air discharge area at the lower end of the second body no greater than same for said first body, and
a substantially flat baffle of area at least equal to the cross-sectional discharge area of the upper of said two bodies disposed intermediate the respective lower and upper ends of said second and first bodies, respectively, whereby to receive air discharged from said bodies substantially normal thereto on each side thereof,
open air intake area adjacent the bottom of said first body substantially equal in cross-sectional area to the cross-sectional area at the edge of said baffle downwardly to the top edge of said first body.

19. A device as in claim 18 including heater means in said second body downstream of the air acceleration means therein.

References Cited by the Examiner
UNITED STATES PATENTS

| | | | |
|---|---|---|---|
| 1,499,894 | 7/1924 | Waterman | 47—2 |
| 2,655,764 | 10/1953 | Watkins | 47—2 |
| 2,796,699 | 6/1957 | Stinson | 47—2 |

ABRAHAM G. STONE, *Primary Examiner.*

R. E. BAGWILL, *Assistant Examiner.*